United States Patent [19]

Gold

[11] 3,902,969

[45] Sept. 2, 1975

[54] METHOD FOR THE INDENTIFICATION OF STREPTOCOCCUS MUTANS

[75] Inventor: Olga G. Gold, Boston, Mass.

[73] Assignee: Forsyth Dental Infirmary for Children, Boston, Mass.

[22] Filed: July 16, 1973

[21] Appl. No.: 379,480

[52] U.S. Cl. .......................... 195/103.5 R; 195/100
[51] Int. Cl.² .......................................... C12K 1/04
[58] Field of Search ...................... 195/103.5 R, 100

[56] References Cited

UNITED STATES PATENTS

| | | | |
|---|---|---|---|
| 3,107,204 | 10/1963 | Brown et al. .................. | 195/103.5 R |
| 3,746,624 | 7/1973 | Hoerman et al. ............ | 195/103.5 R |
| 3,764,480 | 10/1973 | Jedlicka et al. .............. | 195/103.5 R |

OTHER PUBLICATIONS

Barnes, E. M., "Tetrazolium Reduction as a Means of Differentiating *Streptococcus faecalis* from *Streptococcus faecium*", J. Gen. Microbiol. 14, 57–68, (1956).

*Primary Examiner*—A. Louis Monacell
*Assistant Examiner*—C. A. Fan
*Attorney, Agent, or Firm*—Richard P. Crowley

[57] ABSTRACT

A method for identification of *Streptococcus mutans* colonies growing among other oral streptococci on mitis salivarius agar has been developed, wherein colonies of *Strep. mutans* stain dark pink when sprayed with solutions of mannitol or sorbitol and 2,3,5 triphenyl tetrazolium chloride, while colonies of the other streptococci remain blue.

19 Claims, No Drawings

METHOD FOR THE INDENTIFICATION OF STREPTOCOCCUS MUTANS

The invention described herein was made in the course of work under a grant or award from the Department of Health, Education and Welfare.

BACKGROUND OF THE INVENTION

The identification and enumeration of Streptococcus mustans in human oral samples are usually based on its distinctive colonial appearance on mitis salviarius agar (Zinner, et al. 1965; Krasse, 1966, Jordan, Krasse and Moller, 1968). While this method has been very useful, a simpler procedure for detection of this species would be desirable, since: (1) recognizing typical and atypical *Strep.mutans* colonies and differentiating them from the other species that grow on the medium requires considerable experience; and (2) the method which necessitates the use of a dissecting microscope can be tedious when large numbers of samples are involved.

SUMMARY OF THE INVENTION

This invention relates to a method and solutions for the identification of *Streptococcus mutans* by the selective fermenting of mannitol or sorbitol by *Strep.mutans* in the presence of an indicator.

This invention employs a selective medium for the growth of streptococci, such as mitis salivarius agar or other suitable mediums. The *Strep.mutans* colonies on the medium are detected among those of other bacteria on the medium by contacting the *Strep.mutans* colonies with sorbitol or preferably mannitol in the presence of an oxidation-reduction indicator which changes color on the selective fermentation of the mannitol or sorbitol by *Strep.mutans*.

Mannitol or sorbitol, or a combination thereof, must be employed in the practice of the invention, since other polyhydroxyl alcohols and mono saccharides are ineffective in permitting the differentials of *Strep.mutans* from other organisms. The invention shall be described for the purposes of illustration only by the use of triphenyl tetrazolium chloride (TTC) as the indicator. This indicator in its oxidized state and at a pH of under 6.0 is colorless, while in its reduced state is red. Other indicators which change color or otherwise change in observable or detectable properties on the fermenting of the mannitol may be employed as the indicator. Typically, the method of identification is carried out by contacting; e.g., spraying, dipping, washing, etc., the *Strep.mutans* colonies on the medium with mannitol or sorbitol and the indicator at a pH of greater than 6.0; e.g., 7 to 8, at a temperature of about 20° to 45°C.

The mannitol or sorbitol may be applied first, followed by the indicator, or where desired, the mannitol or sorbitol and the indicator, such as TTC, may be incorporated in a single solution for application to the *Strep.mutans*. The solution comprises mannitol or sorbitol, or combinations thereof, in an amount sufficient to permit the *Strep.mutans* to ferment sufficiently mannitol or sorbitol to change the indicator and permit the identification and amount of *Strep.mutans* colonies; e.g., 0.1 to 20%. Concentrations up to about 10% of the mannitol or sorbitol provide maximum color with a TTC indicator. The solution is a buffered solution at a selected pH; for example, in Sorenson's phosphate buffer at a pH of about 7.4. The indicator is present in an amount to provide the desired color change; e.g. with TTC 0.1 to 5%. A preferred solution comprises up to 10% mannitol or sorbitol, 4% TTC in a buffered phosphate solution at 7.4. Mannitol is the preferred compound; however, sorbitol may also be used, since 80 to 90% *Strep.mutans* ferment sorbitol.

A method was developed for the selective staining of *Strep.mutans* colonies which permitted their rapid detection among the unstained colonies of other bacterial species growing on mitis salivarius agar. *Strep.mutans* is one of the few oral streptococcal species capable of fermenting mannitol and sorbitol (Edwardsson, 1968; Carlsson, 1968). The pathway of mannitol and sorbitol catabolism in *Strep.mutans* has been described by Brown and Wittenberger (1973).

DESCRIPTION OF THE EMBODIMENTS

EXAMPLE 1

Cells of *Strep.mutans* were washed twice and resuspended using Sorenson's phosphate buffer pH 7.4 (Documenta Geigy Scientific Tables). These cells incubated in the presence of mannitol and 2, 3, 5 triphenyl tetrazolium chloride (TTC) showed a reduction of the colorless TTC to a red formazan. This reduction was not observed when washed cells of *Streptococcus mitis*, *Streptococcus salivarius* or *Streptococcus sanguis* were used. No reduction of TTC by washed cells of any of the four species was observed in the absence of mannitol. These results indicated that TTC reduction could be used as an indicator of mannitol fermentation by *Strep.mutans*.

EXAMPLE 2

One representative of each of the 5 serological groups of *Strep.mutans* (Bratthall, 1970) were plated on mitis salivarius agar (Difco Laboratories, Detroit, Mich.) and incubated for 24 hrs at 37°C under an atmosphere of 95% nitrogen and 5% carbon dioxide followed by overnight aerobic incubation at room temperature. The plates were then sprayed with a 10% solution of mannitol and incubated aerobically for 3 hrs at 37°C. The plates were next sprayed with a 4% solution of 2, 3, 5 triphenyl tetrazolium chloride (Schwarz-Mann, Orangeburg, N.Y.) and incubated aerobically for another hour at 37°C. The solutions of mannitol and TTC were made up in Sorenson's phosphate buffer pH 7.4, and sprayed on the plates using glass chromatography spray bottles. The TTC solution was made up in an amber glass bottle just before use. Colonies of *Strep.mutans* sprayed in the above manner developed a dark pink color.

EXAMPLE 3

Appropriate dilutions of dental plaque samples were plated, incubated and sprayed with mannitol and TTC as described above for the pure cultures of *Strep.mutans*. Representatives of colonies that stained pink as well as those that remained blue were subcultured to test their ability to ferment mannitol and sorbitol and to form adhesive growth in sucrose broth. These tests in conjunction with colonial morphology on mitis salivarius agar confirmed the identity of pink colonies as *Strep.mutans*. None of the blue colonies subcultured showed characteristics of *Strep.mutans*.

Color contrast between pink and blue colonies was sufficient to allow differential enumeration of *Strep.mutans* and the other streptococci with the Quebec colony counter. The pink color of *Strep.mutans* colonies is stable once formed. On prolonged storage of the plates for several hours, a slow non-specific reduction of TTC by the other oral streptococci may result in a feeble staining of the blue colonies thus diminishing the contrast between pink and blue colonies. Colonies from sprayed plates were subcultured at intervals up to 20 hrs to detect viable cells. Positive subcultures could be obtained during this entire period.

Overnight aerobic incubation at room temperature subsequent to 24 hrs anaerobic incubation as used for the identification of *Strep.mutans* colonies (Jordan, Krasse, and Moller, 1968) was important for the differential production of formazan by *Strep.mutans*. Plates that had been incubated anaerobically could not be immediately sprayed with mannitol and TTC since the overall low Eh caused all colonies to be stained red. The presence of mannitol-fermenting organisms other than *Strep.mutans* in the mouth requires that the differential TTC staining be carried out on a medium selective for streptococci.

The only colonies besides those of *Strep.mutans* that were stained when sprayed with mannitol and TTC were identified as enterococci. This was not unexpected since certain enterococcus species are known to ferment mannitol, and in addition, the ability to reduce TTC has been used to identify strains of enterococci (Barnes, 1956). In the present work a non-specific reduction of TTC by enterococci on mitis salivarius agar was observed even in the absence of mannitol. Formazan stained colonies of the enterococci were round, smooth, flat and bright red and could be easily differentiated from those of *Strep.mutans*.

The method described for the differential staining of *Strep. mutans* colonies on mitis salivarius agar could be especially useful in studies relating the number of *Strep.mutans* to the total oral streptococcal flora and in general could provide a simple laboratory method for macroscopic identification of *Strep.mutans* colonies.

REFERENCES

1. Barnes, E. M. 1956. Tetrazolium reduction as a means of differentiating *Streptococcus faecalis* from *Streptococcus faecium*. J. Gen. Microbiol. 14, 57–68.
2. Bratthall, D. 1970. Demonstration of five serological groups of streptococcal strains resembling *Streptococcus mutans*. Odont. Revy 21, 143–152.
3. Brown, A. T. and Wittenberger, C. L. 1973. Mannitol and sorbitol catabolism in *Streptococcus mutans*. Archs oral Biol. 18, 117–126.
4. Carlsson, J. 1968. A numerical taxonomic study of human oral streptococci. Odont. Revy 19, 137–160.
5. Documenta Geigy Scientific Tables. 1956. 5th ed. J. R. Geigy, S. A. Basle, Switzerland, p. 105.
6. Edwardsson, S. 1968. Characteristics of caries-inducing human streptococci resembling *Streptococcus mutans*. Archs oral Biol. 13, 637–646.
7. Jordan, H. V., Krasse, B., and Moller, A. 1968. A method of sampling human dental plaque for certain "caries inducing" streptococci. Archs oral Biol. 13, 919–927.
8. Krasse, B. 1966. Human streptococci and experimental caries in hamsters. Archs oral Biol. 11, 429–436.
9. Zinner, D., Jablon, J., Aran, A., and Saslaw, M. 1965. Experimental caries induced in animals by streptococci of human origin. Proc. Soc. Exp. Biol. 118, 766–770.

What is claimed is:

1. A method of identifying *Streptococcus mutans*, which method comprises:
   a. inoculating a selective growth medium for streptococci with a bacteria sample containing *Streptococcus mutans*;
   b. incubating the inoculated medium to provide *Strep.mutans* colonies;
   c. contacting the *Strep.mutans* with mannitol or sorbitol, or combinations thereof, and fermenting the mannitol or sorbitol in the presence of an oxidation-reduction indicator which changes color on the fermentation of the mannitol or sorbitol by the *Strep.mutans*; and
   d. identifying the *Strep.mutans* by the differential staining of the *Strep.mutans* colonies by change in color of the indicator.

2. The method of claim 1 wherein the selective growth medium is mitis salivarius agar.

3. The method of claim 1 wherein the bacteria sample is a sample from the oral cavity of a patient.

4. The method of claim 1 wherein the indicator is triphenyl tetrazolium chloride.

5. The method of claim 1 wherein the mannitol or sorbitol and the indicator are sprayed onto the medium containing the *Strep.mutans*.

6. The method of claim 5 wherein the medium is first sprayed with an aqueous mannitol or sorbitol-containing solution and, after incubation, sprayed with a triphenyl tetrazolium chloride solution.

7. The method of claim 1 wherein the mannitol or sorbitol and the indicator are separately applied as solutions and aerobically incubated after each application.

8. The method of claim 1 wherein incubating the medium is carried out, first, anaerobically, and then aerobically.

9. The method of claim 1 wherein the inoculated incubated stained colonies consist essentially of *Strep.mutans* and enterococci.

10. The method of claim 1 wherein the mannitol or sorbitol and the indicator are applied to the *Strep.mutans* colonies in an aqueous phosphate buffered solution having a pH of about 7.4.

11. A method of identifying *Streptococcus mutans*, which method comprises:
    a. contacting Strep.mutans colonies on a mitis salivarius agar growth medium with mannitol or sorbitol, or combinations thereof, and a triphenyl tetrazolium chloride indicator and fermenting the mannitol or sorbitol by the *Strep.mutans* and to obtain a change in color of the indicator from colorless to red; and
    b. identifying the colonies of *Strep.mutans* on the agar.

12. The method of claim 11 wherein the growth medium is inoculated with a bacteria sample from the oral cavity of a patient; and wherein the step of identifying includes determining the number of *Strep.mutans* to the total oral streptococcal flora of the sample.

13. The method of claim 11 wherein the mannitol or sorbitol and the indicator are separately sprayed in aqueous solutions onto the surface of the growth medium, and incubated after each such spraying.

14. The method of claim 11 wherein the mannitol or sorbitol and the triphenyl tetrazolium chloride are in phosphate buffered aqueous solutions having a pH of about 7.4.

15. An aqueous solution useful for the identification of *Streptococcus mutans* which comprises in combination:
   a. mannitol or sorbitol or a combination thereof; and
   b. triphenyl tetrazolium chloride, the solution buffered at a pH of greater than 6.0.

16. The solution of claim 15 which is a phosphate buffered solution having a pH of about 7.4.

17. The solution of claim 15 wherein the mannitol or sorbitol is present in an amount of up to about 0.1 to 20% by weight, and the triphenyl tetrazolium chloride in an amount of 0.1 to 5.0% by weight.

18. An aqueous solution useful for the identification of *Streptococcus mutans* which comprises in combination: up to about 10% by weight of mannitol or sorbitol, or combinations thereof, and triphenyl tetrazolium chloride as an indicator, the solution phosphate buffered at a pH of about 7.4.

19. A method of identifying *Strep.mutans* and differentiating *Strep.mutans* from other streptococci and enterococci, which method comprises:
   a. providing a medium containing thereon colonies of *Strep.mutans* and other organisms, the colonies derived from a sample taken from the oral cavity of a patient;
   b. contacting the colonies on the medium with an aqueous solution comprising mannitol or sorbitol or a combination thereof and triphenyl tetrazolium chloride in the colorless reduced state;
   c. incubating the colonies so contacted, and fermenting selectively the mannitol or sorbitol by the *Strep.mutans* to oxidize and change the color of the triphenyl tetrazolium chloride, thereby staining the *Strep.mutans* colonies a dark pink color; and
   d. identifying and differentiating the stained *Strep.mutans* colonies from the other organisms on the medium.

* * * * *